United States Patent [19]
Grant et al.

[11] Patent Number: 5,192,340
[45] Date of Patent: Mar. 9, 1993

[54] HOLLOW FIBER FILTER CLEANING SYSTEM AND MORE PARTICULARLY TO THE CONTROL OF EMISSIONS FROM SOLVENT CLEANING EQUIPMENT

[75] Inventors: David C. H. Grant, Selbyville, Del.; Randolph H. Watkins, Wonder Lake, Ill.; Robert M. Sluga, Gurnee, Ill.; Steven J. Wurgler, Cary, Ill.; Gregory D. Mills, Mountain Home, Ark.; Dennis C. Berry, Woodstock; Jerry D. Fisher, McHenry, both of Ill.

[73] Assignee: Baxter International, Inc.

[21] Appl. No.: 839,965

[22] Filed: Feb. 21, 1992

Related U.S. Application Data

[63] Continuation-in-part of Ser. No. 581,020, Sep. 12, 1990, Pat. No. 5,106,404.

[51] Int. Cl.$^5$ ............................................. B01D 19/00
[52] U.S. Cl. ...................................... 55/23; 55/40; 55/55; 55/71; 55/89
[58] Field of Search ........................... 55/40-48, 55/50, 51, 55, 71, 89, 189, 195, 208, 23; 210/636

[56] References Cited

U.S. PATENT DOCUMENTS

| | | | |
|---|---|---|---|
| 2,129,299 | 9/1938 | Bichowsky | 55/50 |
| 4,048,007 | 9/1977 | Valle-Riestra | 55/51 X |
| 4,066,423 | 1/1978 | McGill et al. | 55/48 |
| 4,261,707 | 4/1981 | Bradshaw et al. | 55/48 |
| 4,265,642 | 5/1981 | Mir et al. | 55/48 X |
| 4,383,838 | 5/1983 | Barten et al. | 55/48 |
| 4,528,001 | 7/1985 | Yokogawa et al. | 55/48 X |
| 4,574,005 | 3/1986 | Cobbs, Jr. et al. | 55/48 |
| 4,708,721 | 11/1987 | Ehrler | 55/40 |
| 4,902,310 | 2/1990 | Vara et al. | 55/46 |
| 5,106,404 | 4/1992 | Grant | 55/195 |

FOREIGN PATENT DOCUMENTS 3124388 2/1983 Fed. Rep. of Germany .......... 55/46

Primary Examiner—Robert Spitzer
Attorney, Agent, or Firm—Ronald E. Barry; Charles R. Mattenson

[57] ABSTRACT

An emission control system for a fluid composition comprised of volatile constituents used to clean a hollow fiber filter or capillary flow dialyzer including a housing having a chamber for receiving the dialyzer, a control system is used for establishing a desired environment in the chamber, the dialyzer and the fibers, a separator operatively associated with the chamber for separating gas and liquid components of the fluid composition, a stripper connected to the separator for fractionating lower boiling point volatiles from the gas to return the higher boiling point volatiles to the fluid phase and yield a stripped or solvent humidified gas and a delivery system for routing the stripped gas to the chamber dialyzer and fibers as a drying agent.

18 Claims, 2 Drawing Sheets

5,192,340

HOLLOW FIBER FILTER CLEANING SYSTEM AND MORE PARTICULARLY TO THE CONTROL OF EMISSIONS FROM SOLVENT CLEANING EQUIPMENT

BACKGROUND OF THE INVENTION

Methods of solvent emission control are now inadequate for reducing the impact the emissions have on our environment and for controlling the costs of cleaning operations due to the ramifications of the Montreal Protocol. The uncertainty of which solvents will be available to use in the future, make it imperative that new solvent cleaning equipment designs be flexible to insure compatibility with any current solvents or new solvents which are environmentally safe and cost efficient.

RELATED APPLICATION

This application is a continuation-in-part of application Ser. No. 07/581,020, filed Sep. 12, 1990, entitled "Emission Control System For Fluid Compositions Having Volatile Constituents And Method Thereof", now U.S. Pat. No. 5,106,404, issued on Apr. 21, 1992.

SUMMARY OF THE INVENTION

The present invention provides an improved emission control system for cleaning hollow fiber filters which minimize the escape of compositions to the atmosphere such as chlorofluorocarbons (CFC's) and similar volatile compounds. The "Vacuum to Vacuum" system as described in copending application Ser. No. 07/581,020, provides a closed loop system for each fluid flow path in a dialysis filter which dramatically reduces solvent emissions compared to a standard open top degreaser. The system is universal in that almost any solvent could be used without any major machine modification. Vacuum drying is used to prevent solvent dragout and to eliminate any potential product damage which might be caused by elevated drying temperatures. This system requires no material handling mechanism within the solvent wash or solvent vapor areas thus preventing vapor dragout and difficult maintenance repairs.

A hollow fiber filter generally includes a case or tube having a bundle of hollow fibers running lengthwise in the case. This case is sealed at the ends with a potting material with the open ends of the fibers exposed. The ends are capped to provide a fluid flow path through the hollow fibers. Connections are made at each end of the case to provide a separate flow path around the outside of the fibers.

One or more hollow fiber filters can be placed in a close fitting chamber and clamped in position for cleaning. The filter is positioned in the chamber and held in place by clamps provided at each end of the chamber. A basic vacuum to vacuum process is employed as described in the above-identified copending application Ser. No. 07/581,020. Air is evacuated from the chamber and cleaning solvent is introduced into the fibers, into the case, and into the chamber, thus simultaneously cleaning the inside of the fibers, the outside of the fibers, and the outside of the case. One of the advantages of the system is the absence of a requirement for an absolute seal of the connections to the filter since the entire filter is housed in a chamber.

The system takes advantage of the ability to use a combination of liquid purging, air drying (heated if needed) and vacuum so that the filter is cleaned and dried completely and quickly.

Solvent left on the outside of the fibers within the bundle have been a problem. This is due to the capillary forces which keep significant liquid in the bundle. If vacuum only is used, there is not enough heat in the fibers to evaporate the liquid existing there. Since the center of each fiber is open, warm/hot air can be directed through the fibers to evaporate the solvent liquid. The fibers are left warm, thus when the vacuum is imposed, any residual liquid will be evaporated. Since there is adequate means to direct heat where needed, it is not necessary to raise temperatures more than incrementally above solvent boiling point. The chamber pressure can be reduced below the boiling point at 1 atm causing the solvent to boil in the tubes. Drying temperature can be controlled to any practical desired level.

Another facet of drying is the use of relatively dry (solvent free) gas to pick up the solvent being evaporated and to transport it to the stripper for recovery.

Other advantages of the present invention and a fuller understanding of its operation and the system which implements it will be appreciated upon examination of the detailed description which follows, taken in conjunction with the Figures in the drawings.

DETAILED DESCRIPTION OF THE PREFERRED EMBODIMENTS

The present invention relates generally to the cleaning of a capillary flow dialyzer 10 by the introduction of volatile constituents from fluid compositions incident to the cleaning procedure of the fibers and the case. The vacuum to vacuum emission control system described in the above-identified copending application Ser. No. 07/581,020 and incorporated herein by reference describes a closed loop solvent recovery system of the type contemplated herein for cleaning the dialyzer.

Figure 1:
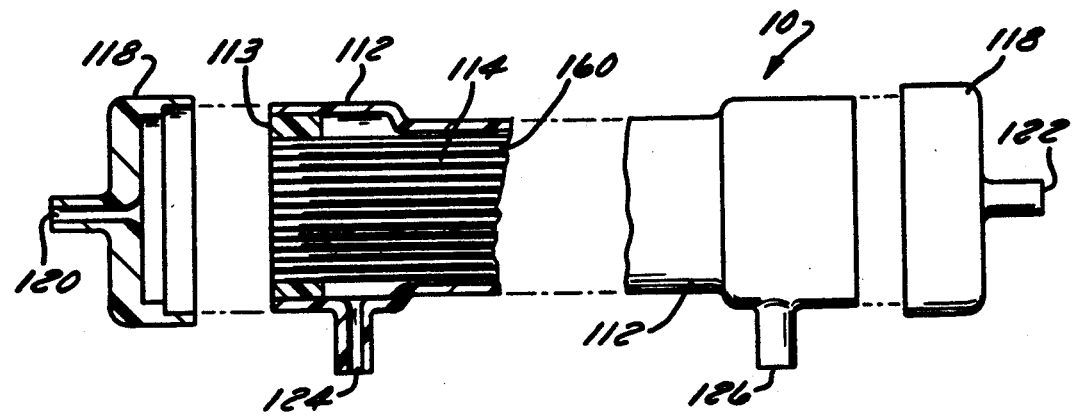
FIG. 1 is an exploded view partly in section of a hollow fiber filter assembly.

Referring to FIG. 1, the hollow fiber dialyzer 10 includes a case 112 having a bundle 114 of hollow fibers 160 running lengthwise in the case 112. The case is sealed at each end with a potting material 113 leaving the open ends of the fibers 160 exposed. The ends of the case are closed by caps 118 having inlet and outlet connections, 120 and 122. Inlet and outlet ports 124 and 126 are provided at each end of the sides of the case for passing solvents through the inside of the case 112.

Figure 2:
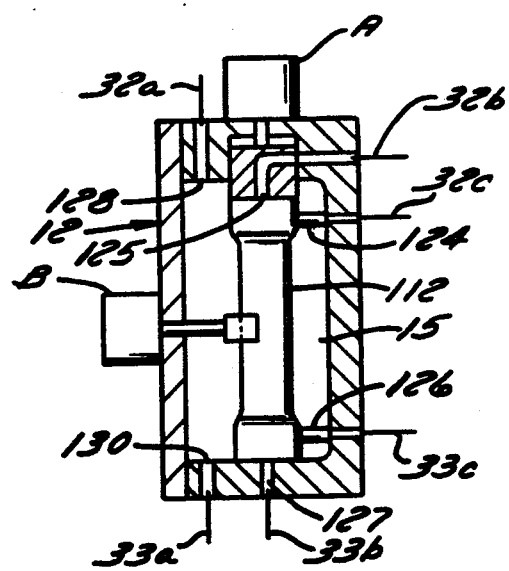
FIG. 2 is a sectional view of the filter assembly mounted in the cozy.
Figure 3:
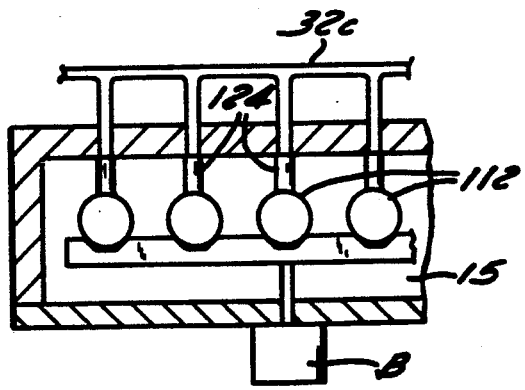
FIG. 3 is a representative view of a multiple filter assembly.

The dialyzer 10 is mounted in a chamber 15 in cozy 12 having inlet and outlet openings 128 and 130, as shown in FIG. 2. It should be noted that the caps 118 have been removed and the case 112 has been seated in the cozy 12 by pneumatic clamps A and B. Inlet and outlet ports 124 and 126 for the case 112 are aligned with inlet and outlet ports for conduits 32C and 33C, respectively. The inlet and outlet ends of the fibers 160 are connected to inlet and outlet ports 125 and 127 for conduits 32b and 33b, respectively. The inlet and outlet ports 128 and 130 are connected to conduits 32a and 33a, respectively. A multiple type cozy 12 is shown in FIG. 3 with a number of dialyzer cases 112 shown connected to conduit 32c by clamp B.

Figure 4:
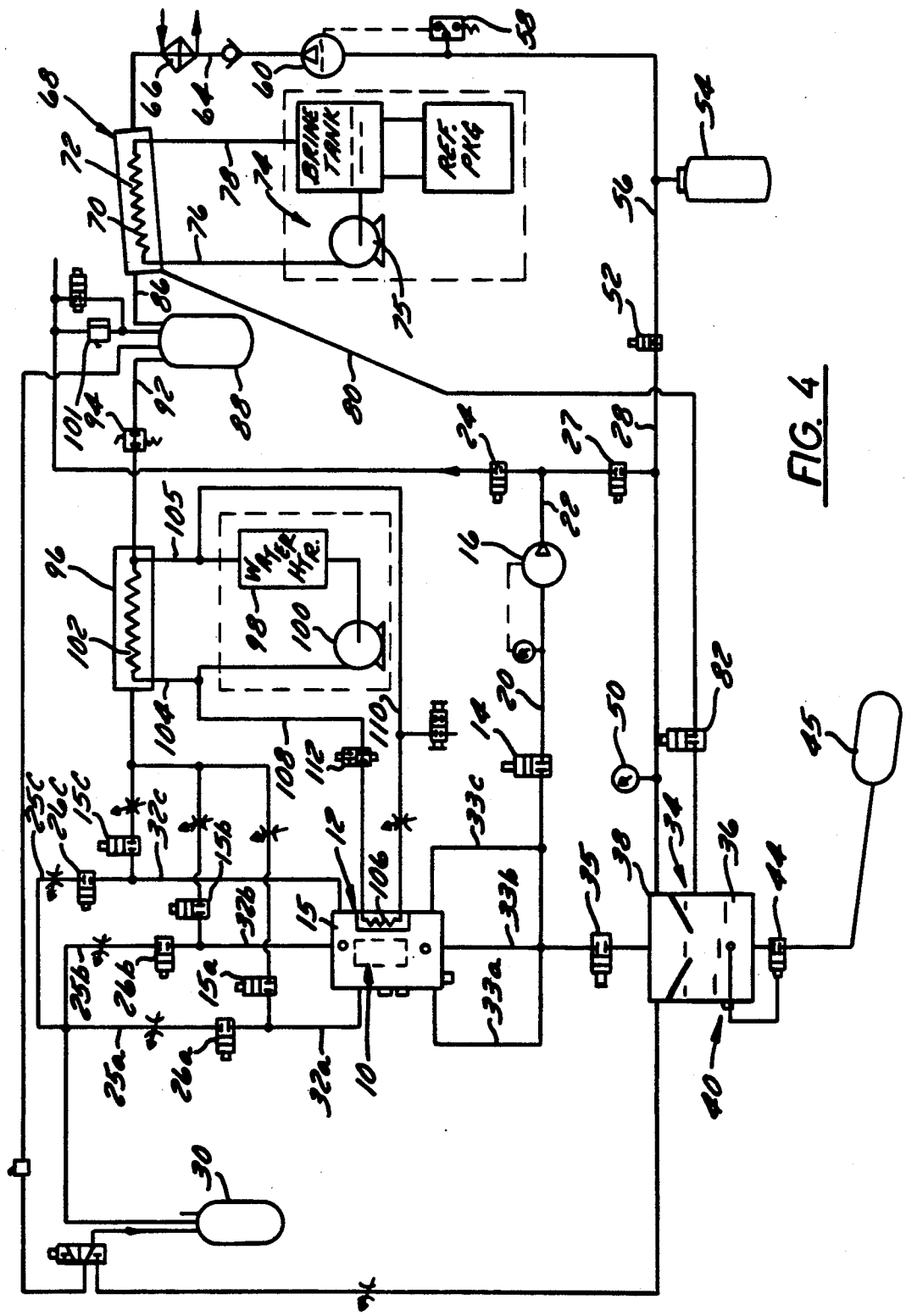
FIG. 4 is a schematic diagram of the emission control system for cleaning hollow fiber filter assemblies.

The cozy 12, as shown schematically in FIG. 4, includes a treatment chamber 15 in which the capillary flow dialyzer 10 is mounted. A vacuum pump 16 is connected to the conduits 33a, 33b and 33c by conduit 20. A solenoid valve 14 is provided in conduit 20 to close the chamber 15. The vacuum pump 16 communicates ultimately via a conduit 22 to the atmosphere through a solenoid 24 or to a gas liquid separator 34 through a solenoid valve 27 and a conduit 28. Once chamber 15 is evacuated, it is connected to the remainder of the system without undue risk of introducing unwanted materials to the atmosphere.

Solvent is admitted into the cozy from a solvent supply 30 via conduits 25a, 25b and 25c, solenoid valves 26a, 26b, and 26c and conduits 32a, 32b, and 32c. It should be noted that conduit 32a is connected to the port 128 in chamber 15, conduit 32b is connected to the hollow fiber filters through a port 125 and 32c is connected to the case through port 128. The cleaning fluid or solvent carries any contaminant or entrained gas to the liquid gas separator 34 through conduits 33a, 33b, and 33c and solenoid valve 35. The liquid phase separates gravimetrically to liquid receivers 36 disposed in the lower confines of the separator 34. Gas accumulates in well 38 in the upper portion of the separator 34.

High and low level switch 4 is responsive to the level of the liquid phase within the separator 34. When the liquid level rises sufficiently to trip the high level switch, it energizes the solenoid valve 44 to drain fluid to the liquid recovery tank 45. The solvent in reservoir 45, is treated in a conventional fashion and recycled to solvent supply reservoir 30.

The gas phase, which rises into the well 38 is conducted from the separator 34 when pressure switch 50 senses the buildup of gas within the well 38 and opens the solenoid valve 52. The gas is admitted to a low pressure accumulator 54 via conduit 56. When the pressure in the accumulator 54 achieves a preset level, a pressure switch 58 is tripped to activate a gas compressor 60, which compresses the gas and discharges it to conduit 64.

Compressed gas exiting compressor 60 via the conduit 64 is delivered to a cooler 66 to remove the heat of compression. Thereafter the gas is routed to a fractionator designated generally as 68 having a heat exchange chamber 72 and a stripper 70 across which the compressed gas flows. The stripper 70 is chilled by a brine solution pumped by a brine pump 75 from a brine chiller 74 through inlet 76 to stripper 70 and discharged through an outlet 78 back to the chiller 74. Typically, solvent vapor condenses in the chamber 72 and is ported from the chamber 72 via line 80 through a solenoid valve 82 to the liquid receiver 45.

Gas which has been stripped from the higher boiling point constituents is tapped from the fractionator 68 via a conduit 86 to a gas receiver 88. The gas in receiver 88 is passed through a pressure regulating valve 94 in a conduit 92. The gas heater 96 is comprised of a heat source 98 and a pump 100, which is connected to the heater coil 102 through inlet conduit 104 and outlet conduits 105. If the pressure in receiver 88 rises to too great a level, e.g. from ingestion of air through the chamber, that air is purged from the system via pressure control valve 101.

After the treatment process has been completed, the dialyzer is dried and otherwise freed from residual liquid solvent. This is achieved by a three step process which initially requires a purging of the chamber 15 by blowing heated stripped gas from heater 96 through, solenoid valves 15a, 15b and 15c which ar connected to chamber 15 through conduits 32a, 32b and 32c. In the second step or gas flushing phase two processes are involved: (a) evaporation of the liquid solvent by exposure of the liquid to dry (solvent dehumidified) air, and (b) boiling the solvent with heat added from the gas. The heat naturally occurring in the circulating gas may be augmented by heat added in its passage through gas heater 96. After the liquid solvent has been evaporated, the chamber is evacuated to evaporate any last vestige of liquid and to remove the residual solvent vapor. This final evacuation step returns the solvent vapor to the system for recovery. The drying operation removes the last trace of solvent and other volatiles from the interior of chamber 15. The chamber 15 can also be heated by water pump 100 which is connected to a heater coil 106 in chamber 12 through conduits 108 and 110 by opening solenoid valve 112.

The process of cleaning is basically a vacuum to vacuum process. Air is removed from the chamber 15 and vacuum is broken from inside the system by opening solenoid valve 41 or 42. Solvent is directed from solvent supply 30 into the chamber 15 through conduit 32a and port 128, into the case through conduit 32c and port 124, and into the fibers through conduit 32b and port 125. The solvents are drained from the chamber 15 to the liquid separator tank 34 through conduits 33a, 33b, and 33c. The solvents are removed by purging, flushing and imposing a vacuum in the system to remove liquid existing in the chamber. However, it has been found that solvent left on the outside of the fibers and in the fibers in the bundle can be a problem. Capillary forces keep significant liquid in the bundle. Since the center of each fiber is open, warm/hot air can be directed through the fibers for enough time to evaporate the solvent liquid.

The fibers are left warm, thus when the vacuum is imposed, any residual liquid will be evaporated. Since there is adequate means to direct heat where needed, it is not necessary to raise temperatures more than incrementally above the solvent boiling point. Even then, chamber pressure can be reduced to lower the temperature at which the solvent will boil. Drying temperature can be controlled to any practical desired temperature. Another facet of drying is the use of relatively dry (low solvent relative humidity) gas to pick up the solvent being evaporated and to carry it to the stripper for recovery.

In the event that liquid remains trapped in the fibers after the initial vacuum, the liquid will begin to evaporate due to the decreased pressure, but since there will not be enough heat in the area, its temperature will drop to the saturation temperature commensurate to the pressure in the chamber. For example, if the liquid was CFC-113 and the pressure is reduced to 29 in. Hg (mercury), the temperature of the liquid would drop from about 100°–120° F. to about 0° F. In so doing, it would draw as much heat from the surrounding fibers as it could. The situation now exists where as much solvent has evaporated as possible with the given amount of available heat. (Note: The coldest parts of the filter will be close to 0° F. The dry parts of the filter will remain at 100°–110° F., since there was no liquid to evaporate and cool them off.)

Additional flushing with hot air has the following effect. As the air flows through the cores of the fibers, the temperature of the fiber that was dry will be relatively high, so there will be little heat transferred from the air there, but when the hot air comes in proximity to an area where there was liquid, that region will be very cold, thus with the increased differential temperature, the heat will flow much more quickly into that region. What we see is "selective transfer." The available heat flows directly and selectively into the areas that need it most. These are the areas that harbored liquid solvent. Following this second air flush, the chamber is evacuated again to remove solvent laden air within the chamber. The solenoid valves, 41 or 42, are then opened to atmosphere for removal of the cleaned product.

Thus, it should be apparent that there has been provided in accordance with the present invention hollow fiber filter cleaning system and more particularly to the control of emissions from solvent cleaning equipment that fully satisfies the aims and advantages set forth above Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method for controlling atmospheric emission of volatile fluids used in cleaning a hollow fiber dialyzer by contact with a fluid composition comprised of volatile constituents, comprising the steps of:
   (a) positioning the dialyzer in a chamber capable of maintaining pressure or vacuum and a selected temperature;
   (b) evacuating said chamber to reduce ambient air contamination, discharging chamber contents to atmosphere;
   (c) first flushing said chamber with a fluid composition comprised of volatile constituents;
   (d) recovering said fluid composition following said first flushing step;
   (e) flushing said chamber with a drying fluid derived form the recovered fluid; and
   (f) subsequently, evacuating said chamber in one or more iterations, discharging chamber contents within the system and breaking the final vacuum from atmosphere.

2. The method of claim 1, wherein said recovering step comprises the steps of collecting the fluid used to treat said dialyzer in said first flushing step and separating said fluid into liquid and gas phases.

3. The method of claim 2, further comprising the step of fractionating said gas phase, to recover and recycle higher boiling point fluid(s) and yield a stripped gas.

4. The method of claim 3, further comprising the step of heating said stripped gas for introduction to said chamber in said subsequent flushing step as said drying fluid.

5. The method of claim 4, wherein said fractionating step comprises the steps of compressing and cooling said gas and returning any condensate to said liquid phase.

6. The method of claim 5, wherein said fluid composition is comprised of a chlorofluorocarbon, hydrocarbon, chlorocarbon, organic or other volatile fluid solvent.

7. An emission control system for a fluid composition comprised of volatile constituents used to clean a hollow fiber filter or capillary flow dialyzer comprising:
   (a) a housing having a chamber for receiving the dialyzer to be cleaned by contact with or exposure to a volatile fluid;
   (b) control means for establishing a desired environment in said chamber, in the dialyzer and in the fibers including means for establishing a desired pressure within said chamber, dialyzer and fibers and means for introducing the fluid composition into said chamber, dialyzer, and fibers;
   (c) separator means operatively associated with said chamber for separating gas and liquid components of said fluid composition;
   (d) stripping means communicating with said separator means for fractionating the lower boiling point volatile constituents form said gas component, to return the higher boiling point volatiles form said gas component to the fluid phase and yield a stripped or solvent humidified gas; and
   (e) means for delivering said stripped gas to said chamber, dialyzer and fibers for service as a drying agent.

8. The emission control system of claim 7, wherein said control means includes a vacuum pump for evacuating said chamber and porting means to selectively route air removed form said chamber during the initial evacuation, back to the room and to break the initial vacuum with gas form within the system.

9. The emission control system of claim 7, wherein said control means includes a vacuum pump and porting means to selectively route gas removed from said chamber during the final evacuation, or iterations thereof, to the stripping means and to break the final vacuum selectively from within the system or from the room.

10. The emission control system of claim 7, wherein said control means includes porting means to route stripped gas, either heated or unheated, through said hollow fiber filter and said chamber to purge the hollow fiber filter and chamber of liquid solvent and further to evaporate the remaining liquid solvent in said filter and said chamber.

11. The emission control system of claim 7, wherein said control means includes gas compressing means to establish and maintain pressure within said chamber during processing of the hollow fiber filter.

12. The emission control system of claim 7, wherein said control means includes means to establish and maintain a desired temperature within said chamber.

13. The emission control system of claim 7, wherein said control means includes means to maintain the surface of the stripper at a low temperature and porting means to return condensed solvent to a liquid receiver.

14. The emission control system of claim 7, wherein said separator means comprises a liquid receiver, said system further comprising a liquid reclamation reservoir in fluid communication with said liquid receiver.

15. The emission control system of claim 7, wherein said separator means comprises a gas well, said system further comprising a gas receiver in fluid communication with said gas well and a gas compressor intermediate therewith for directing said gas from said well under pressure to said gas receiver.

16. The emission control system of claim 15, wherein said stripping means comprises a heat exchanger upstream of said gas receiver for condensing said higher boiling point volatiles.

17. The emission control system of claim 16, including heating means downstream of said gas receiver.

18. The emission control system of claim 17, wherein said fluid composition is a chlorofluorocarbon, hydrocarbon, chlorocarbon, organic or other volatile fluid solvent.

* * * * *